United States Patent
Asakura

(10) Patent No.: US 9,011,057 B2
(45) Date of Patent: Apr. 21, 2015

(54) BLIND RIVET AND FASTENING METHOD THEREOF

(75) Inventor: Takashi Asakura, Toyohashi (JP)

(73) Assignee: Newfrey LLC, Newark, DE (US)

( * ) Notice: Subject to any disclaimer, the term of this patent is extended or adjusted under 35 U.S.C. 154(b) by 117 days.

(21) Appl. No.: 13/295,395

(22) Filed: Nov. 14, 2011

(65) Prior Publication Data

US 2012/0117786 A1     May 17, 2012

(30) Foreign Application Priority Data

Nov. 16, 2010 (JP) ................................ 2010-255623

(51) Int. Cl.
    *F16B 19/10*     (2006.01)
    *F16B 43/00*     (2006.01)

(52) U.S. Cl.
    CPC ............ *F16B 19/1063* (2013.01); *F16B 43/00* (2013.01); *F16B 19/1054* (2013.01)

(58) Field of Classification Search
    USPC ...................... 411/34, 43, 533, 180, 181, 339
    See application file for complete search history.

(56) References Cited

U.S. PATENT DOCUMENTS

| | | | |
|---|---|---|---|
| 2,061,628 A | | 11/1936 | Huck |
| 3,175,462 A | * | 3/1965 | Disley .............................. 411/37 |
| 3,215,024 A | | 11/1965 | Brilmyer et al. |
| 3,298,270 A | * | 1/1967 | Launay .......................... 411/542 |
| 4,261,245 A | * | 4/1981 | Mauer .............................. 411/43 |
| 4,436,467 A | * | 3/1984 | Larsson et al. ................... 411/34 |
| 4,509,243 A | * | 4/1985 | Schneider et al. .......... 29/402.02 |
| 4,585,382 A | * | 4/1986 | Bryce, Jr. .......................... 411/34 |
| 4,687,217 A | * | 8/1987 | Stewart .......................... 280/848 |
| 4,865,499 A | | 9/1989 | Lacey |
| 5,256,020 A | * | 10/1993 | Ikeda et al. ..................... 411/368 |
| 5,762,456 A | * | 6/1998 | Aasgaard ......................... 411/29 |
| 6,357,981 B1 | * | 3/2002 | Lanham et al. ................ 411/431 |
| 7,699,570 B2 | * | 4/2010 | Trotter et al. .................. 411/533 |
| 7,954,517 B1 | * | 6/2011 | Marinelli ......................... 138/99 |

FOREIGN PATENT DOCUMENTS

| | | |
|---|---|---|
| DE | 102005003770 B3 | 7/2006 |
| GB | 425469 A | 3/1935 |
| GB | 1000561 A | 8/1965 |
| GB | 2081833 A | 2/1982 |

* cited by examiner

*Primary Examiner* — Flemming Saether
(74) *Attorney, Agent, or Firm* — Kofi Schulterbrandt; Michael P. Leary

(57) ABSTRACT

The blind rivet for fastening together a plurality of mounted components with mounting holes comprises a rivet body having a sleeve, a flange and a through hole; a mandrel having a slender stem and a head; and a washer. The head of the mandrel is adjacent to the sleeve-side end portion of the rivet body, the stem of the mandrel extends through the rivet body from the flange-side end portion, and the washer is mounted near the flange on the outer periphery of the sleeve of the rivet body. A portion of the outer peripheral surface of the sleeve adjacent to the flange is swaged to form a recessed portion so that the diameter in the other position is enlarged. The washer is pushed onto the enlarged-diameter portion and secured. The mounted components are fastened together between the enlarged end portion of the sleeve and the washer.

6 Claims, 5 Drawing Sheets

BLIND RIVET AND FASTENING METHOD THEREOF

CROSS-REFERENCE TO RELATED APPLICATIONS

This application claims priority from Japanese Patent Application No. 2010-255623, filed on Nov. 16, 2010, the disclosure of which is incorporated herein by reference.

BACKGROUND OF THE INVENTION

The present invention relates to a blind rivet. More specifically, the present invention relates to a blind rivet and fastening method therefor in which mounted components with large mounting holes can be fastened together using a blind rivet with a washer.

A well-known blind rivet contains a hollow metal rivet body composed of a sleeve and a flange at one end of the sleeve, and a metal mandrel whose stem extends from the flange of the sleeve and passes through the rivet body. This blind rivet is advantageously able to fasten together a plurality of panels by performing an operation on only one side. A flange is formed in one end of the rivet body of the blind rivet, and the rivet body has a cylindrical hollow sleeve extending from the flange. The mandrel in the blind rivet has in the end portion a head whose outer diameter is greater than the inner diameter of the sleeve, and a stem whose outer diameter is able to pass through the rivet body. The head of the mandrel is arranged adjacent to the end of the sleeve which is on the opposite side relative to the flange of the rivet body, and the stem of the mandrel is inserted into the through hole in the rivet body from the flange so as to extend out and complete the assembled blind rivet. The blind rivet is inserted into holes in mounted components such as panels with the head of the mandrel inserted first, and the flange on the sleeve makes contact with the area surrounding the hole in a mounted component. In this state, the flange on the sleeve is held with a fastening tool, and the stem of the mandrel is gripped and pulled strongly from the flange side of the rivet. This deforms one end of the sleeve in the blind rivet and expands the diameter. The mandrel breaks off in the slender breakable portion of the stem, and the panels or other mounted components are fastened between the flange on the rivet body and the expanded-diameter end of the sleeve.

In the case of a blind rivet of the prior art, it is assumed that the outer diameter of the rivet body is greater than the inner diameter of the holes in the mounted components to be fastened. When the outer diameter of the flange on the rivet body is smaller than the inner diameter of the holes in the mounted components to be fastened, the panels or other mounted components cannot be fastened together. As a result, various rivet bodies with different flange diameters have to be prepared based on the hole diameter of the mounted components.

PRIOR ART DOCUMENTS

[Patent Document 1] Japanese Unexamined Patent Application No. 63-254212

Patent Document 1 discloses a self-locking blind rivet. The blind rivet in Patent Document 1 includes a rivet body having a trunk and a rivet head at one end of the trunk, a plug in which a spiral-shaped groove has been formed and which is connected by a bendable portion to an axial stem tail portion, and an axial stem having an end portion. When the blind rivet is fastened, material from the rivet head enters the spiral-shaped groove and becomes fastened. When the rivet head is turned, the fastened rivet can be released fairly easily. The blind rivet in Patent Document 1 cannot be fastened when the hole diameter in the panels to be fastened is greater than the flange diameter of the rivet body.

Therefore, there is demand for a blind rivet that can be used to fasten together panels even when the inner diameter of the holes in the panels to be fastened is greater than the outer diameter of the flange in the rivet body. There is also demand for a blind rivet that can fasten mounted components with different hole diameters.

SUMMARY OF THE INVENTION

Therefore, an object of the present invention is to provide a blind rivet that can fasten together mounted components such as panels even when the inner diameter of the mounting hole in the mounted components is greater than the outer diameter of the flange of the rivet body. Also, a blind rivet able to fasten together mounted components with different hole diameters is provided.

The present invention is able to achieve this object by attaching a washer whose outer diameter is greater than the inner diameter of the holes in the fastened panels near the flange of the rivet body so that panels with large mounting holes can be fastened together.

The first aspect of the present invention is a blind rivet for fastening together a plurality of mounted components with mounting holes, wherein the blind rivet comprises a rivet body having a hollow sleeve and a flange formed in one end of the sleeve, a through hole being formed so as to pass from the sleeve-side end portion to the flange-side end portion, a mandrel having a slender stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the flange and whose outer diameter is greater than the outer diameter of the flange, and wherein the head of the mandrel is arranged adjacent to the sleeve-side end portion of the rivet body, the stem of the mandrel is configured so as to extend through the rivet body from the flange-side end portion, and the washer is mounted near the flange on the outer periphery of the sleeve of the rivet body.

A portion of the outer peripheral surface of the sleeve adjacent to the flange of the rivet body can be pushed in to form a recessed portion, and the washer can be pushed into and mounted on the expanded-diameter portion of the sleeve in a portion other than the recessed portion.

A recessed portion can be formed in two locations on the outer periphery of the sleeve on opposite sides circumferentially, and the portion between the recessed portions on the outer periphery of the sleeve can be the expanded-diameter portion with a larger outer diameter. Here, the inner periphery of the washer is fitted onto the expanded-diameter portion and secured.

The recessed portion can be formed with the rivet body and mandrel already assembled. In this way, when the recessed portion is formed, the inner diameter of the sleeve in the rivet body is more difficult to deform, and the mandrel can be kept from becoming fixed to the rivet body or unable to be inserted into the rivet body.

The outer peripheral surface of the sleeve adjacent to the flange of the rivet body can be pushed on both sides radially to form an oval-shaped cross-section, and the washer can be pushed onto and secured to the enlarged-diameter portion of the sleeve with a larger outer diameter. In this way, a portion with a large outer diameter can be easily formed in the sleeve to secure the inner periphery of the washer. A protrusion can be formed in an outer peripheral portion of the sleeve in the rivet body adjacent to the flange, and a washer can be pushed into the protrusion and secured.

Alternatively, the blind rivet can be inserted into the mounting holes of mounted components from the head of the mandrel so the surface of the washer contacts the periphery of the mounting holes of the mounted components when the mounted components are fastened, and the end portion of the sleeve can be pushed by the head to expand the diameter and fasten the mounted components between the expanded-diameter end portion of the sleeve and the washer when the flange of the rivet body is supported and the stem of the mandrel is pulled out from the flange end.

In the blind rivet, the mandrel can be broken at the small diameter breakable portion of the stem and the section from the breakable portion to the side with the head remains when the mounted components are fastened.

The second aspect of the present invention is a method for fastening together mounted components using a blind rivet, wherein a rivet body having a hollow sleeve, a flange formed in one end of the sleeve, and a through hole, a mandrel having a slender stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the flange and whose outer diameter is greater than the outer diameter of the flange are prepared, wherein the rivet body, the mandrel and the washer are combined to form a blind rivet, and wherein the blind rivet is inserted into the mounting holes of mounted components from the head of the mandrel and the surface of the washer contacts the periphery of the mounting holes of the mounted components when the mounted components are fastened, and the end portion of the sleeve is pushed by the head to expand the diameter and fasten the mounted components between the expanded-diameter end portion of the sleeve and the washer when the flange of the rivet body is supported and the stem of the mandrel is pulled out from the flange end.

In this method, during the step in which the rivet body, mandrel and washer are combined to form a blind rivet, the mandrel can be inserted from the tip portion into the through hole from the sleeve-side end portion of the rivet body, the head of the mandrel contacting the sleeve-side end portion and stopping, a portion of the sleeve in the rivet body can be pushed in to form a recessed portion and an expanded-diameter portion in a position on the sleeve other than the recessed portion whose outer diameter is larger, and a washer can be pushed into the expanded-diameter portion from the head side of the mandrel and secured.

In the present invention, a blind rivet is provided that can fasten together mounted components even when the inner diameter of the mounting hole in the mounted components is greater than the outer diameter of the flange of the rivet body. If combined with washers of different outer diameters, a blind rivet able to fasten together mounted components with different hole diameters can be provided.

DETAILED DESCRIPTION OF THE PREFERRED EMBODIMENTS

The following is an explanation with reference to the figures of the blind rivet equipped with a washer in an embodiment of the present invention.

Figure 1:
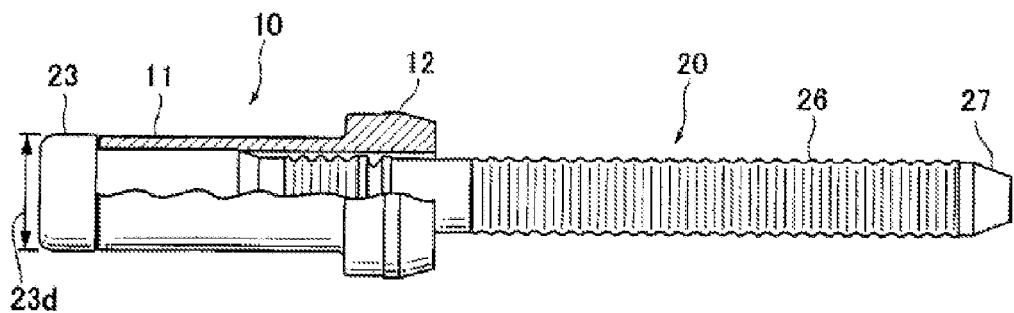
FIG. 1 is a cross-sectional front view of a portion of the blind rivet in an embodiment of the present invention.

FIG. 1 is a cross-sectional front view of a portion of the blind rivet in an embodiment of the present invention. The blind rivet includes a rivet body 10 and a mandrel 20. The mandrel 20 is inserted from the sleeve-side end portion 14 of the rivet body 10, and the head 23 of the mandrel 20 is arranged adjacent to the sleeve-side end portion 14 of the rivet body 10.

Figure 2:
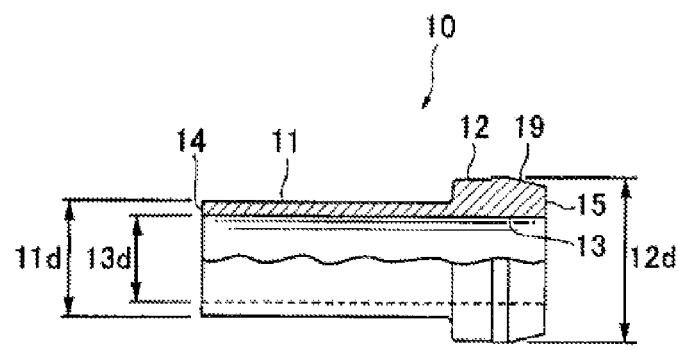
FIG. 2 is a cross-sectional front view of a portion of the rivet body in the blind rivet of FIG. 1.
Figure 3:
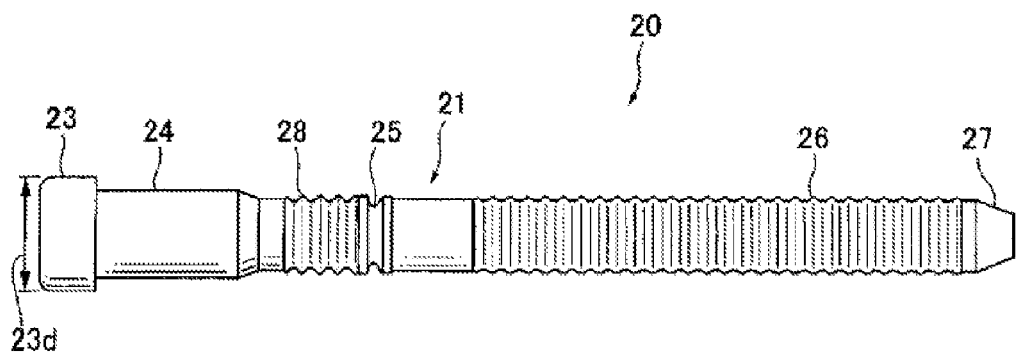
FIG. 3 is a front view of the mandrel in the blind rivet of FIG. 1.
Figure 4:
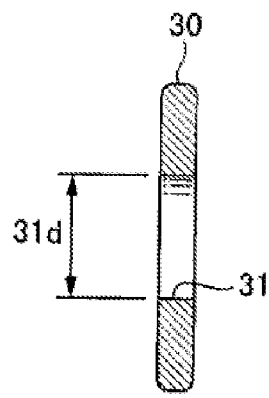
FIG. 4 is a cross-sectional view of the washer in the embodiment of the present invention.

The following is an explanation with reference to FIG. 2 through FIG. 4 of the rivet body 10, mandrel 20, and washer 30 constituting the blind rivet. FIG. 2 is a cross-sectional front view of a portion of the rivet body 10 used in the blind rivet of the embodiment of the present invention. The rivet body 10 has a cylindrical sleeve 11, and a flange 12 formed at one end of the sleeve 11 whose diameter is greater than that of the sleeve 11. The tip portion of the flange 12 has an inclined portion 19 whose outer diameter is reduced to a tapered shape, and end portion at the flange-side end portion 15. When the blind rivet is fastened, the inclined portion 19 is pushed by the gripping component 51 of the fastening tool from the outer periphery and reduced.

The opposite side of the sleeve 11 from the flange 12 is the sleeve-side end portion 14. A through hole 13 extends between the flange-side end portion 15 of the rivet body 10 and the sleeve-side end portion 14. The inner diameter 13d of the through hole 13 is large enough to allow the stem 21 of the mandrel 20 to be inserted, but smaller than the outer diameter of the head 23 of the mandrel 20 so that the head 23 makes contact with the sleeve-side end portion 14 and stops. The outer diameter 11d of the sleeve 11 is somewhat smaller than the diameter of the mounting holes in the mounted components but a size that allows it to pass through the mounting holes. The rivet body 10 can be made of a material softer than the mandrel 20 such as aluminum or an aluminum alloy. It can also be made of the same material as the mandrel 20 such as steel.

FIG. 3 is a front view of the mandrel 20 in the blind rivet of the embodiment of the present invention. The mandrel 20 is equipped with a slender stem 21 and a head 23 on one end of the stem 21. The outer diameter 23d of the head 23 is greater than the inner diameter 13$d$ of the through hole 13 in the rivet body 10. The outer diameter 23$d$ of the head 23 is smaller than the inner diameter 42$d$ of the mounting holes 42 in the mounted components 40 so that it can pass through the mounting holes 42. The stem 21 is column-shaped and has an outer diameter smaller than the inner diameter 13$d$ of the through hole 13 in the rivet body 10 so that it can be inserted into the through hole 13. The length of the stem 21 is greater than the length of the through hole 13 of the rivet body 10. When the stem 21 of the mandrel 20 is inserted into the through hole 13 in the rivet body 10, the tip of the stem 21 protrudes from the flange-side end portion 15 of the rivet body 10.

The stem 21 of the mandrel 20 includes from the head 23, a column-shaped portion 24, an engagement portion 28, a breakable portion 25, a gripped portion 26, and a tip portion 27. The column-shaped portion 24 is adjacent to the head 23. The outer diameter of the column-shaped portion 24 is somewhat larger than the inner diameter 13$d$ of the through hole 13, and is forcibly inserted into the through hole 13. This keeps the mandrel from coming out of the sleeve. The engagement portion 28 is adjacent to the column-shaped portion 24. Two circumferential grooves are formed circumferentially at a given interval in the engagement portion 28, and an engagement protrusion is formed between the grooves. When the blind rivet is fastened, a portion of the flange 12 is pushed from the outer periphery and its inner diameter is reduced. The engagement protrusion engages the inner periphery of the through hole 13 which has a smaller inner diameter, and a portion of the mandrel is kept from coming out of the rivet body 10.

The breakable portion 25, which has an outer diameter smaller than that of the engagement portion 28, is adjacent to the engagement portion 28. The breakable portion 25 is a portion accommodated in the through hole 13 of the rivet body 10 when the blind rivet is assembled. When the stem 21 of the mandrel 20 is pulled out strongly using a fastening tool, the breakable portion 25 breaks once a certain withdrawal force is exceeded. The gripped portion 26, which has a diameter greater than that of the breakable portion 25, is adjacent to the breakable portion 25. A plurality of engagement grooves are formed in the gripped portion 26 so that it does not slip when gripped by the fastening tool. The tip portion 27 of the stem 21 has a slender tip. The tip is slender so that it can be more easily inserted into the fastening tool. The mandrel 20 is made of steel.

FIG. 4 is a cross-sectional view of the washer 30 used in the blind rivet of the embodiment of the present invention. The washer 30 is a disk-shaped component. A center hole 31 is opened in the center portion with a round cross-section viewed axially. The inner diameter 31$d$ of the center hole 31 is somewhat smaller than the outer diameter 23$d$ of the head 23 of the mandrel 20, and equal to or somewhat greater than the outer diameter 11$d$ of the sleeve 11. When the mandrel 20 and the rivet body 10 have been assembled, the washer 30 can be inserted on the sleeve 11 of the blind rivet from the head 23 side of the mandrel 20. The inner diameter 31$d$ of the center hole 31 is large enough to fix the washer 30 to the outer periphery of the sleeve 11 when the sleeve 11 has been slightly deformed to form the expanded-diameter portion.

Figure 5:
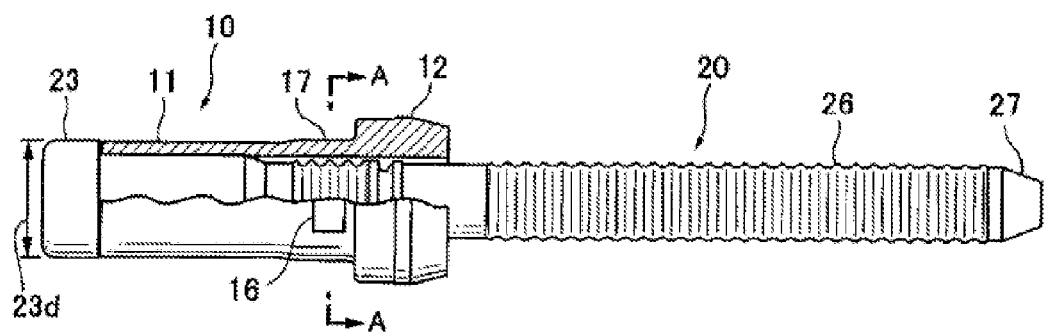
FIG. 5 is a cross-sectional front view of a portion of the blind rivet in the embodiment of the present invention showing the swaged portion of the sleeve in the rivet body.
Figure 6:
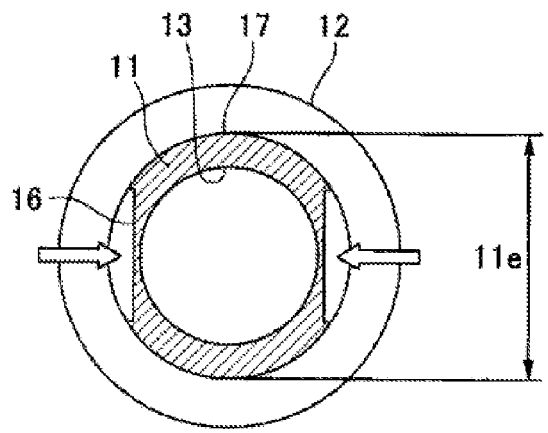
FIG. 6 is an enlarged cross-sectional view of the blind rivet from A-A in FIG. 5.

The following is an explanation with reference to FIG. 5 through FIG. 8 of the steps performed to create the blind rivet with a washer in the embodiment of the present invention. Here, one end of the sleeve 11 on the rivet body 10 of the blind rivet is pushed in and swaged, and the washer 30 is pushed into the portion with an external shape greater than the swaged portion of the sleeve 11. FIG. 5 is a cross-sectional front view of a portion of the blind rivet in the embodiment of the present invention showing the swaged portion of the sleeve 11 in the rivet body 10. FIG. 6 is an enlarged cross-sectional view of the blind rivet from A-A in FIG. 5. First, the rivet body 10 and the mandrel 20 are combined. The mandrel 20 is inserted into the through hole 13 from the sleeve-side end portion 14 of the rivet body 10. The tip portion 27 of the mandrel is inserted first. The head 23 of the mandrel 20 makes contact with the sleeve-side end portion 14 and stops.

Next, the blind rivet in which the rivet body 10 and the mandrel 20 have been combined is pushed in at two locations on the sleeve 11 of the rivet body 10 on opposite ends radially using a swaging machine to form recessed portions 16. At this time, the outer diameter of the sleeve 11 in the direction perpendicular to the recessed portions 16 is the expanded-diameter portion 17 whose outer diameter 11$e$ is somewhat greater than the original outer diameter 11$d$. The inner diameter 31$d$ of the center hole 31 in the washer 30 is somewhat smaller than the outer diameter 11$e$ of the expanded-diameter portion 17 which enlarges the sleeve 11 so that it becomes fixed when the washer 30 is pushed into the expanded-diameter portion 17.

Preferably, the swaging is performed after the rivet body 10 has been combined with the mandrel 20. In this way, when the recessed portions 16 are formed in the rivet body 10, the inner peripheral surface of the through hole 13 is supported by the stem of the mandrel so that the inner peripheral surface of the through hole 13 is not deformed. Alternatively, the swaging can be performed with a hard column-shaped component conforming to the inner diameter of the through hole 13 inserted into the through hole 13 of the rivet body 10. The mandrel 20 can be inserted afterwards.

In this embodiment, the recessed portions 16 are formed in the portion of the outer peripheral surface of the sleeve 11 in the rivet body 10 adjacent to the flange 12. Even when recessed portions 16 are not formed, the sleeve 11 can be pushed in at two locations on opposite sides radially to give the portion of the sleeve 11 an oval shape. This forms an expanded-diameter portion whose outer diameter is slightly greater than the inner diameter 31$d$ of the center hole 31 of the washer 30. The washer 30 can thus be fixed to the expanded-diameter portion. Alternatively, protrusions can be formed in a portion of the outer peripheral surface of the sleeve 11 in the rivet body 10 adjacent to the flange. These protrusions engage and secure the inner diameter of the washer 30.

Figure 7:
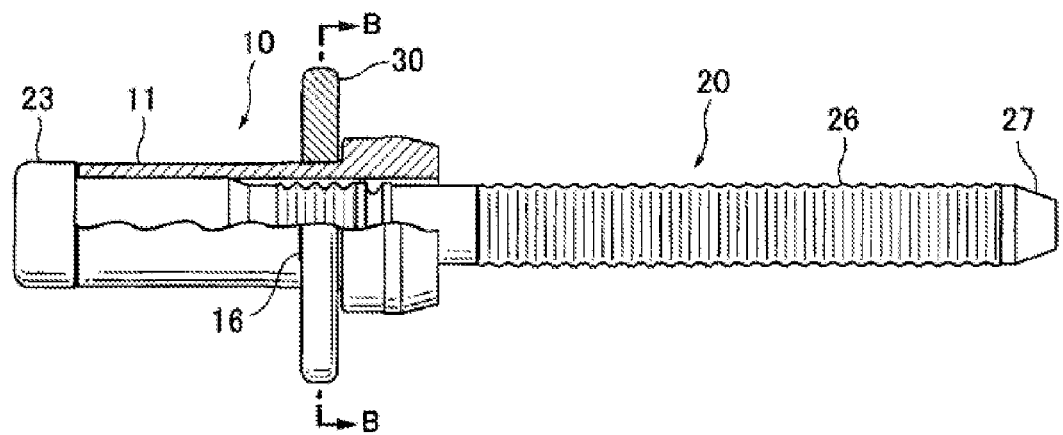
FIG. 7 is a cross-sectional front view of a portion of the embodiment of the present invention showing the washer mounted on the blind rivet.
Figure 8:
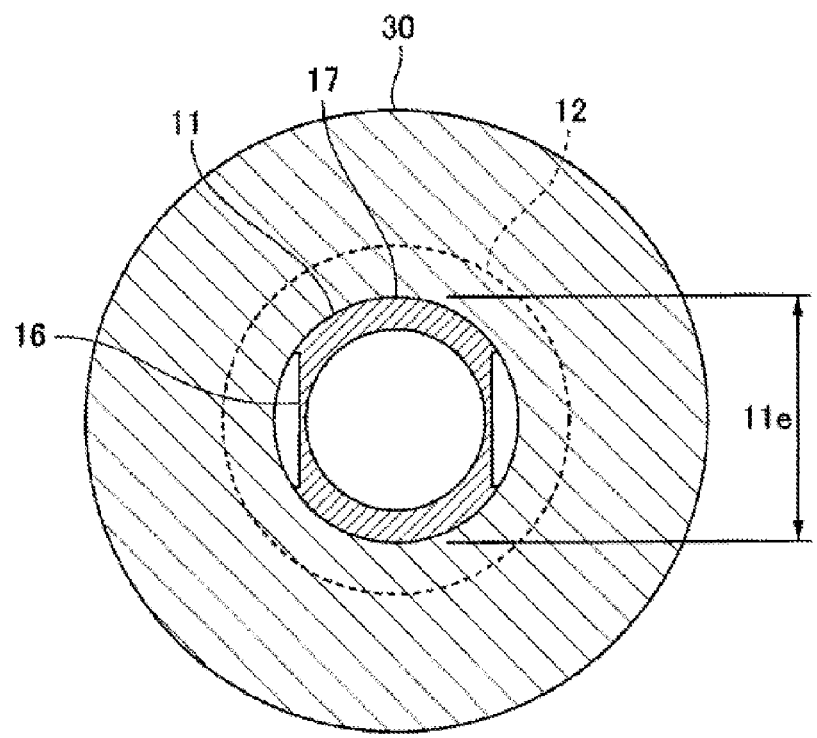
FIG. 8 is an enlarged cross-sectional view of the blind rivet from B-B in FIG. 7.

FIG. 7 is a cross-sectional front view of a portion of the embodiment of the present invention showing the washer 30 mounted on the blind rivet. FIG. 8 is an enlarged cross-sectional view of the blind rivet from B-B in FIG. 7. The washer 30 is inserted over the sleeve 11, pushed into the expanded-diameter portion 17, and secured. This completes the blind rivet with washer in the embodiment of the present invention.

Figure 9:
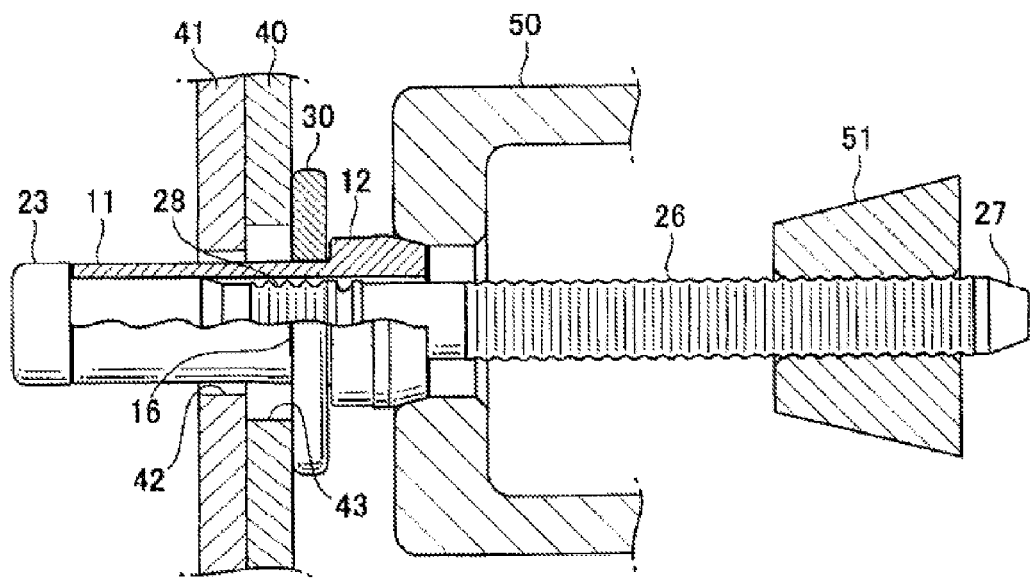
FIG. 9 is a cross-sectional front view of a portion showing the blind rivet in FIG. 7 inserted into the holes in the mounted components.
Figure 10:
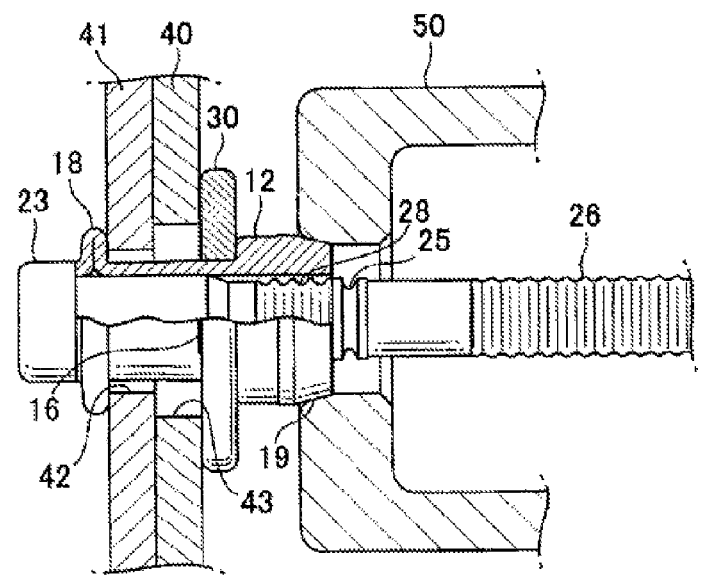
FIG. 10 is a cross-sectional front view of a portion of the intermediate stage for fastening together mounted components using the blind rivet in FIG. 7.
Figure 11:
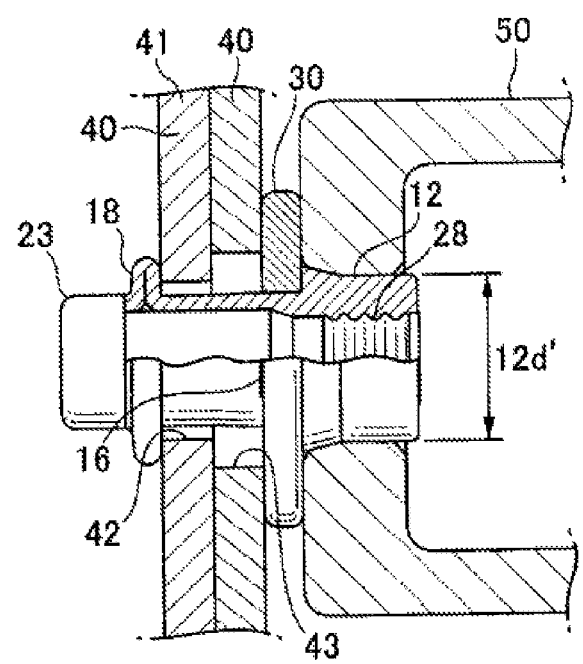
FIG. 11 is a cross-sectional front view of a portion showing the mounted components fastened together using the blind rivet in FIG. 7.

The following is an explanation with reference to FIG. 9 through FIG. 11 of the operations performed to fasten together mounted components 40, 41 using the blind rivet in the embodiment of the present invention. FIG. 9 is a cross-sectional front view of a portion showing the blind rivet set in the mounted components 40, 41. In FIG. 9, the left side is the blind side, and the blind rivet is mounted from the right side.

In FIG. 9, the mounting hole 43 in mounted component 40 is larger than the mounting hole 42 in mounted component 41. The inner diameter of the mounting hole 43 in mounted component 40 is greater than the outer diameter 12$d$ of the flange 12. In this case, the mounted components 40, 41 cannot be fastened using a blind rivet of the prior art because the flange passes through the mounting hole 43 in mounted component 40. Because the embodiment of the present invention uses a washer 30 whose outer diameter is greater than the inner diameter of the mounting hole 43 in mounted component 40, mounted components 40 and 41 can be fastened.

The mounted components 40, 41 are placed together so that the positions of the mounting hole 43 in mounted component 40 and the mounting hole 42 in mounted component 41 are aligned. The rivet body 10 and the mandrel 20 are assembled, and a washer 30 is mounted to obtain the blind rivet in FIG. 7, which is inserted into the holes in the mounted components 40, 41 from the right side of FIG. 9. The washer 30 mounted on the rivet body 10 makes contact with the peripheral surface of the mounting hole 43 in the mounted component 40.

FIG. 10 is a cross-sectional front view of a portion of the intermediate stage in which mounted component 40 is fastened using the blind rivet. While holding the inclined portion 19 near the tip of the flange 12 in the rivet body 10 using the nose piece 50 of a fastening tool, the gripped portion 26 of the mandrel 20 is gripped with the gripping component 51 of the fastening tool and pulled. At this time, the head 23 of the mandrel 20 is pushed into the sleeve-side end portion 14 of the sleeve 11 in the rivet body 10 to form an expanded portion 18. The expanded portion 18 makes contact with the periphery of the mounting hole 42 in mounted component 41.

FIG. 11 is a cross-sectional front view of a portion showing the mounted components 40, 41 fastened together by the blind rivet when the gripped portion 26 of the mandrel 20 is again pulled. While the inclined portion 19 of the flange 20 is pulled from the outer periphery by the nose piece 50, the flange 20 becomes deformed such that its outer diameter 12*d* is reduced to become the smaller outer diameter 12*d'*. At this time, the inner peripheral surface of the through hole 13 in a portion of the flange 20 is deformed such that its diameter becomes smaller than inner diameter 13*d*. This engages the engagement protrusions in the engagement portion 28 of the mandrel 20.

When the tip face of the nose piece 50 makes contact with the surface of the washer 30 and stops. The mounted components 40, 41 are interposed between the expanded-diameter portion 18 and the washer 30 of the blind rivet. Afterwards, the mandrel 20 is broken in the breakable portion 25, and the section from the breakable portion 25 to the head 23 remains in the fastened portion. Because the inner periphery of the flange 12 in the rivet body 10 is engaged with the engagement portion 28 of the mandrel 20, the portion of the mandrel 20 remaining in the blind rivet does not come off the blind rivet. Because the remaining portion of the mandrel 20 is fixed securely in the rivet body 10, high fastening force can be obtained. Afterwards, the nose piece 50 is withdrawn to the right in FIG. 11, and the fastening operation is complete.

When mounted components are fastened together using a blind rivet, the inner diameter of the mounting holes in the mounted components is usually smaller than the outer diameter 12*d* of the flange 12. In the embodiment of the present invention, the inner diameter of the mounting holes 43 is larger than the outer diameter 12*d* of the flange 12. However, because a washer 30 is attached whose outer diameter is greater than the inner diameter of the mounting holes 43, the washer 30 makes contact with mounted component 40, and mounted components 40 and 41 can be fastened together. When the inner diameter of the mounting holes in the mounted components is different, the mounted components can be fastened together if a washer with an outer diameter different from the inner diameters is used. As a result, mounting holes with various inner diameters can be accommodated by preparing washers with different outer diameters and combining one type of rivet body 10 and mandrel 20 with washers of varying outer diameters.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A blind rivet for fastening together a plurality of mounted components with mounting holes,
   wherein the blind rivet comprises a rivet body having a hollow sleeve and a flange formed in one end of the sleeve, a through hole being formed so as to pass from a sleeve-side end portion to the flange-side end portion, an outer surface of the hollow sleeve including an increased-diameter portion with a larger diameter than an outer diameter of the sleeve,
   a mandrel having a slender stem whose outer diameter is smaller than the inner diameter of the sleeve and whose length is greater than the rivet body, and a head whose outer diameter is greater than the inner diameter of the sleeve, and
   a washer whose inner diameter is smaller than the outer diameter of the flange and slightly smaller than the outer diameter of the increased-diameter portion so that when the washer is pushed into the expanded-diameter portion the washer is fixable on the sleeve by the expanded diameter portion, the outer diameter of the washer being greater than the outer diameter of the flange, and
   wherein the head of the mandrel is arranged adjacent to the sleeve-side end portion of the rivet body, the stem of the mandrel is configured so as to extend through the rivet body from the flange-side end portion, and the washer is mounted near the flange on the outer periphery of the sleeve of the rivet body, and
   wherein the outer peripheral surface of the sleeve adjacent to the flange of the rivet body is pushed on opposite sides radially so that an outer diameter of the sleeve in a direction perpendicular to the opposite sides is expanded to form an expanded-diameter portion with a diameter greater than a diameter of the pushed opposite sides, so that the outer peripheral surface of the sleeve in a longitudinal direction of the sleeve transitions gradually from an original sleeve diameter to the expanded diameter, and wherein the washer is pushed onto and secured to the expanded-diameter portion of the sleeve.

2. The blind rivet in claim 1, wherein the blind rivet is adapted to be inserted head first into the mounting holes of mounted components and the surface of the washer is adapted to contact the periphery of the mounting holes of the mounted components when the mounted components are fastened, and wherein the end portion of the sleeve is adapted to be pushed by the head to expand the diameter and fasten the mounted components between the expanded-diameter end portion of the sleeve and the washer when the flange of the rivet body is supported and the stem of the mandrel is pulled out from the flange end.

3. The blind rivet of claim 2, wherein the mandrel is adapted to be broken at a small diameter breakable portion of the stem and the section from the breakable portion to the side with the head remains when the mounted components are fastened.

4. A blind rivet for fastening together a plurality of mounted components with mounting holes,
   wherein the blind rivet comprises a rivet body having a hollow sleeve and a flange formed in one end of the sleeve, a through hole being formed so as to pass from a sleeve-side end portion to the flange-side end portion, an outer surface of the hollow sleeve including an increased-diameter portion with a larger diameter than an outer diameter of the sleeve, a mandrel having a slender stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the flange and slightly smaller than the outer diameter of the increased-diameter portion so that when the washer is pushed into the expanded-diameter portion the washer is fixable on the sleeve by the expanded diameter portion, the outer diameter of the washer being greater than the outer diameter of the flange, and wherein the head of the mandrel is arranged adjacent to the sleeve-side end portion of the rivet body, the stem of the mandrel is configured so as to extend through the rivet body from the flange-side end portion, and the washer is mounted near the flange on the outer periphery of the sleeve of the rivet body, wherein a portion of the outer peripheral surface of the sleeve adjacent to the flange of the rivet body forms a recessed portion, and wherein the washer is pushed into and fixed on the expanded-diameter portion of the sleeve to a portion of the sleeve other than the recessed portion, and wherein the expanded diameter portion and the recessed portion have an unequal diameter cross-section; and wherein the recessed portion is formed by a swaging of the sleeve with the rivet body and mandrel assembled so that the outer peripheral surface of the sleeve in a longitudinal direction of the sleeve transitions gradually from an original sleeve diameter to the expanded diameter.

5. The blind rivet of claim 4, wherein the recessed portion is formed in two locations on the outer periphery of the sleeve on opposite sides circumferentially, and wherein the portion between the recessed portions on the outer periphery of the sleeve is the expanded-diameter portion with a larger outer diameter.

6. A blind rivet for fastening together a plurality of mounted components with mounting holes, wherein the blind rivet comprises a rivet body having a hollow sleeve and a flange formed in one end of the sleeve, a through hole being formed so as to pass from a sleeve-side end portion to the flange-side end portion, an outer surface of the hollow sleeve including an increased-diameter portion with a larger diameter than an outer diameter of the sleeve, a mandrel having a slender stem whose outer diameter is smaller than the inner diameter of the sleeve and whose length is greater than the rivet body, and a head whose outer diameter is greater than the inner diameter of the sleeve, and a washer whose inner diameter is smaller than the outer diameter of the flange and slightly smaller than the outer diameter of the increased-diameter portion so that when the washer is pushed into the expanded-diameter portion the washer is fixable on the sleeve by the expanded diameter portion, the outer diameter of the washer being greater than the outer diameter of the flange, and wherein the head of the mandrel is arranged adjacent to the sleeve-side end portion of the rivet body, the stem of the mandrel is configured so as to extend through the rivet body from the flange-side end portion, and the washer is mounted near the flange on the outer periphery of the sleeve of the rivet body, and wherein the outer peripheral surface of the sleeve adjacent to the flange of the rivet body is radially compressed on opposite sides so that an outer diameter of the sleeve in a direction perpendicular to the opposite sides is expanded to form a partially oval-shaped cross-sectional portion with a diameter greater than a diameter of the pushed opposite sides, and wherein the washer is pushed onto and secured to the expanded-diameter portion of the sleeve.

* * * * *